(12) United States Patent
Tackett et al.

(10) Patent No.: US 10,507,992 B2
(45) Date of Patent: Dec. 17, 2019

(54) CONVEYOR SYSTEMS INCLUDING DOLLIES WITH AUTOMATIC UNLOADING MULTI-BAR LINKAGE SYSTEMS FOR AUTOMATICALLY UNLOADING A DOLLY

(71) Applicant: Toyota Motor Engineering & Manufacturing North America, Inc., Erlanger, KY (US)

(72) Inventors: Bradley Scott Tackett, Georgetown, KY (US); Daniel W. Blancett, Lexington, KY (US); Rocky L. Leamer, Georgetown, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 22 days.

(21) Appl. No.: 15/902,778

(22) Filed: Feb. 22, 2018

(65) Prior Publication Data
US 2019/0256306 A1  Aug. 22, 2019

(51) Int. Cl.
*B62B 3/04* (2006.01)
*B65G 67/28* (2006.01)
*B65G 7/04* (2006.01)

(52) U.S. Cl.
CPC .............. *B65G 67/28* (2013.01); *B62B 3/04* (2013.01); *B65G 7/04* (2013.01); *B62B 2203/28* (2013.01); *B62B 2203/74* (2013.01)

(58) Field of Classification Search
CPC .............. B60P 1/006; B60P 1/52; B62B 3/04
USPC ............................... 280/43.12; 414/351, 353
See application file for complete search history.

(56) References Cited

U.S. PATENT DOCUMENTS

| | | | | |
|---|---|---|---|---|
| 1,425,727 A | * | 8/1922 | Wallstrom | B60P 1/52 414/437 |
| 1,708,854 A | * | 4/1929 | Stahlhut | B65G 67/00 414/353 |
| 3,406,849 A | * | 10/1968 | Warren | B60P 1/52 414/523 |
| 3,435,969 A | * | 4/1969 | Carder | B60P 1/52 414/536 |
| 3,514,001 A | * | 5/1970 | Brush | B60P 1/52 414/607 |

(Continued)

FOREIGN PATENT DOCUMENTS

| | | |
|---|---|---|
| CN | 106315158 A | 1/2017 |
| EP | 0171366 A1 | 2/1986 |
| JP | 2002037057 A | 2/2002 |

*Primary Examiner* — Jeffrey J Restifo
(74) *Attorney, Agent, or Firm* — Dinsmore & Shohl LLP (57) ABSTRACT

An automatic unloading dolly that automatically unloads pallets therefrom that includes a frame having a loading/unloading side and a pusher side, a conveyor platform that extends between the loading/unloading side and the pusher side, one or more wheels connected to the frame, a multi-bar linkage system mounted to the frame and connected to a pusher that moves along the conveyor platform from the pusher side toward the loading/unloading side between a pusher base position and a pusher triggered position, and a contact arm link connected to the multi-bar linkage system such that movement of the contact arm link relative to the frame from a contact arm link base position to a contact arm link triggered position moves the multi-bar linkage system and the pusher from the pusher base position to the pusher triggered position.

10 Claims, 8 Drawing Sheets

(56) References Cited

U.S. PATENT DOCUMENTS

| | | | | |
|---|---|---|---|---|
| 3,675,798 A * | 7/1972 | Carder | B60P 1/52 | 414/533 |
| 3,679,075 A * | 7/1972 | Guyaux | B60P 1/52 | 414/533 |
| 3,689,106 A * | 9/1972 | Young | B61D 3/20 | 410/1 |
| 4,049,135 A * | 9/1977 | Glassmeyer | B65D 88/126 | 414/351 |
| 4,274,168 A * | 6/1981 | Depowski | A61G 7/1034 | 414/523 |
| 4,541,768 A * | 9/1985 | Walker | B64F 1/32 | 193/35 MD |
| 4,696,616 A * | 9/1987 | Avey | B65G 65/00 | 193/40 |
| 4,787,808 A * | 11/1988 | Shimoji | B62B 3/04 | 193/35 A |
| 5,037,265 A * | 8/1991 | O'Brien | B65G 13/00 | 14/72.5 |
| 7,007,790 B2 * | 3/2006 | Brannon | B65G 69/22 | 198/346 |
| 7,014,198 B2 * | 3/2006 | Everitt | B62B 3/04 | 280/47.34 |
| 7,435,047 B2 * | 10/2008 | Meijer | B60P 1/52 | 193/35 R |
| 7,695,235 B1 * | 4/2010 | Rallis | B65G 67/20 | 414/280 |
| 7,726,460 B2 * | 6/2010 | Neebe | B65G 65/00 | 198/346.1 |
| 8,282,111 B2 * | 10/2012 | Hailston | B62B 3/0618 | 280/43.12 |
| 8,596,611 B1 * | 12/2013 | Fountain | B66F 9/19 | 254/2 R |
| 8,752,846 B1 * | 6/2014 | White | B66F 9/12 | 280/43.12 |
| 8,851,488 B2 * | 10/2014 | Carruyo | B60P 7/08 | 280/79.11 |
| 9,126,520 B2 * | 9/2015 | Butterfield | B65G 25/065 | |
| 9,334,146 B2 * | 5/2016 | Meijer | B66F 9/19 | |
| 9,592,845 B2 * | 3/2017 | Palma | B62B 3/04 | |
| 2007/0048117 A1 * | 3/2007 | Lawless | B66F 9/12 | 414/619 |
| 2007/0201971 A1 * | 8/2007 | Meijer | B65G 67/20 | 414/679 |

* cited by examiner

CONVEYOR SYSTEMS INCLUDING DOLLIES WITH AUTOMATIC UNLOADING MULTI-BAR LINKAGE SYSTEMS FOR AUTOMATICALLY UNLOADING A DOLLY

TECHNICAL FIELD

The present specification generally relates to conveyor systems for unloading pallets or other cargo onto a conveyor system, and more specifically to conveyor systems including dollies with automatic unloading multi-bar linkage systems for automatically unloading a dolly.

BACKGROUND

Tools and other items or equipment may be useful at various workstations on a vehicle assembly floor. These tools may be distributed using one or more bins on one or more pallets in the vehicle assembly area. For example, a tool may be disposed in a bin resting on a pallet and the tool may be delivered to a particular workstation by loading the pallet on a cart and pulling the cart to one of the various workstations.

Over the course of a single workshift on an assembly floor, many tools or other items or equipment may need to be delivered to various workstations requiring many bins and pallets to be loaded and unloaded to and from dollies that may be delivered to and from the various workstations by being pulled by a cart. For example, in one six hour shift, over 2,500 pallets may be loaded and unloaded to and from dollies on the assembly floor. This volume of loading and unloading of pallets may strain current systems for delivering tools, slowing work flows and adding to inefficiencies on the vehicle assembly floor.

Accordingly, a need exists for conveyor systems having dollies with automatic unloading multi-bar linkage systems for automatically unloading a dolly.

SUMMARY

In one embodiment, an automatic unloading dolly that automatically unloads pallets therefrom includes a frame having a loading/unloading side and a pusher side, a conveyor platform that extends between the loading/unloading side and the pusher side, one or more wheels connected to the frame, a multi-bar linkage system mounted to the frame and connected to a pusher that moves along the conveyor platform from the pusher side toward the loading/unloading side between a pusher base position and a pusher triggered position, and a contact arm link connected to the multi-bar linkage system such that movement of the contact arm link relative to the frame from a contact arm link base position to a contact arm link triggered position moves the multi-bar linkage system and the pusher from the pusher base position to the pusher triggered position.

In another embodiment, a conveyor system for receiving and sorting tools in one or more pallets from a vehicle assembly floor includes an automatic unloading dolly that automatically unloads pallets therefrom that includes a frame having a loading/unloading side and a pusher side, a conveyor platform that extends between the loading/unloading side and the pusher side, one or more wheels connected to the frame, a multi-bar linkage system mounted to the frame and connected to a pusher that moves along the conveyor platform from the pusher side toward the loading/unloading side between a pusher base position and a pusher triggered position, and a contact arm link connected to the multi-bar linkage system such that movement of the contact arm link relative to the frame from a contact arm link base position to a contact arm link triggered position moves the multi-bar linkage system and the pusher from the pusher base position to the pusher triggered position. The conveyor system further includes a landing conveyor that receives pallets automatically unloaded from the automatic unloading dolly as the automatic unloading dolly passes by the landing conveyor.

In yet another embodiment, a method of automatically transferring a pallet from a storage plane on an automatic unloading dolly to a landing conveyor plane on a landing conveyor without stopping the automatic unloading dolly includes directing the automatic unloading dolly toward the landing conveyor. The automatic unloading dolly includes a frame having a loading/unloading side and a pusher side, a conveyor platform that extends between the loading/unloading side and the pusher side, one or more wheels connected to the frame, a multi-bar linkage system mounted to the frame and connected to a pusher that moves along the conveyor platform from the pusher side toward the loading/unloading side between a pusher base position and a pusher triggered position, and a contact arm link connected to the multi-bar linkage system such that movement of the contact arm link relative to the frame from a contact arm link base position to a contact arm link triggered position moves the multi-bar linkage system and the pusher from the pusher base position to the pusher triggered position. The method may further include contacting the contact arm link with the landing conveyor thereby causing the contact arm link to move relative to the frame and such that the pusher moves from the pusher base position to the pusher triggered position, thereby transferring the pallet from the storage plane to the landing conveyor plane.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Tools and other items or equipment may be useful at various workstations on an assembly floor, such as an automobile vehicle assembly floor. These tools may be distributed using one or more bins on one or more pallets in a vehicle assembly area. The tools may be removed from a storage location and sorted into the one or more bins. One or more bins may be placed on a pallet and the pallet may be shipped, via conveyor, to the assembly floor where they may then be placed on a dolly or cart for relocation to an appropriate workstation. The tool may then be used to assemble a vehicle. When the tool is no longer utilized, the tool may be placed back into another bin on a pallet where it may be returned to the storage area.

Over the course of a single workshift on an automobile vehicle assembly floor, many tools or other items or equipment may be delivered to workstations requiring many bins and pallets to be loaded and unloaded to and from dollies that may be delivered to and from the various workstations by being pulled by a cart. For example, in one six hour shift, over 2,500 pallets may be loaded and unloaded to and from dollies on the assembly floor. This volume of loading and unloading of pallets may strain current pallet loading and unloading systems, slowing work flows and adding to inefficiencies on the vehicle assembly floor.

In order to more efficiently deliver tools to workstations, a delivery vehicle such as a dolly or a cart may be used. A single dolly may carry a plurality of tools and bins, and moreover, a series of dollies or carts may be strung together, removing the need for tools to be individually delivered to workstations and multiplying efficiencies. Using this arrangement, tools, bins, and/or pallets may be placed on and removed from dollies. Naturally, the more efficient a tool can be placed on and removed from a dolly, the more efficiently the tool can be delivered to a workstation. Hence, a dolly that has an automatic unloading multi-bar linkage system for automatically unloading one or more pallets from a dolly may be useful.

Figure 1:
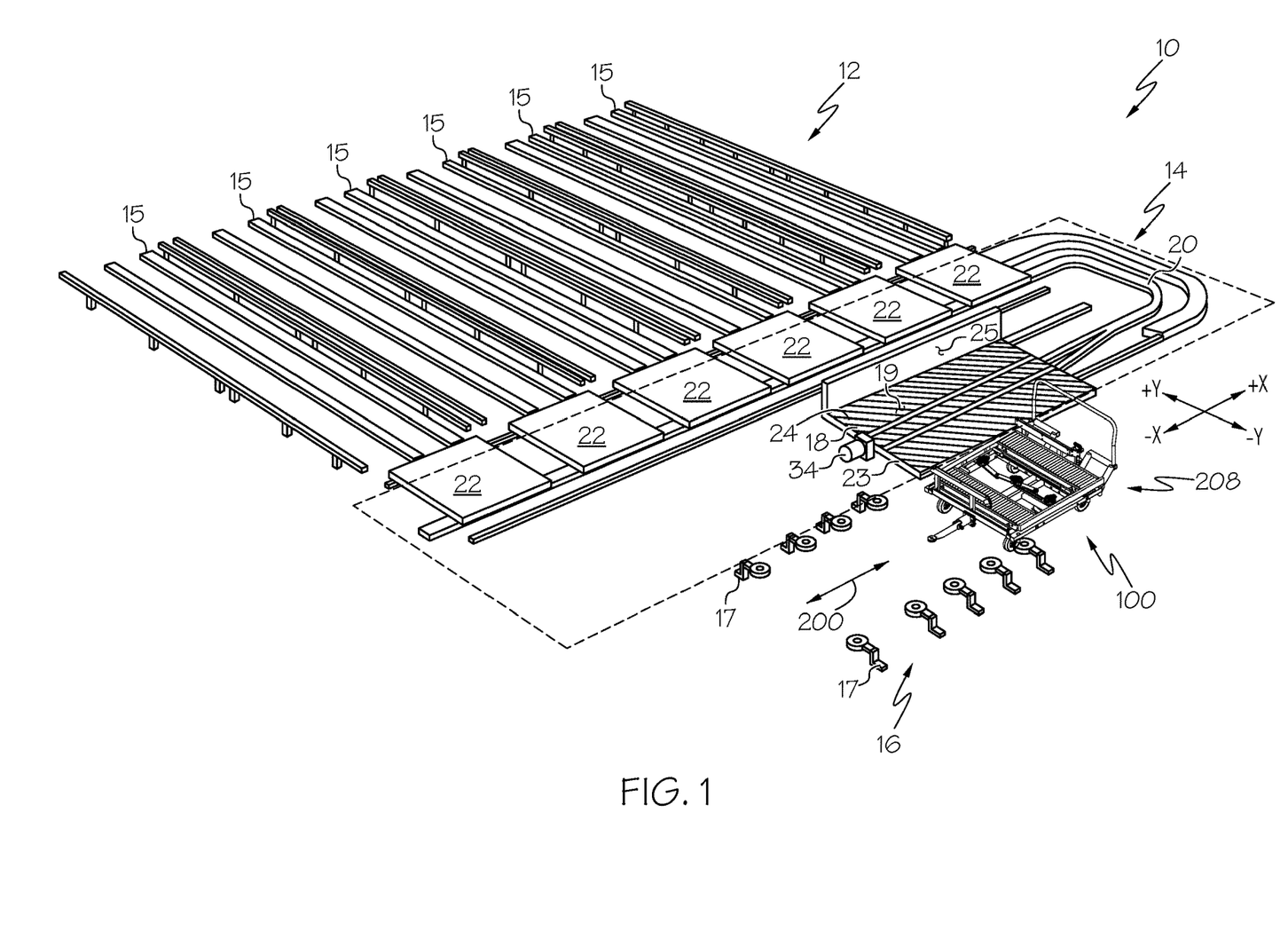
FIG. 1 depicts a schematic view of a conveyor system having a dolly with an automatic unloading multi-bar linkage system for automatically unloading a pallet from the dolly, according to one or more embodiments shown and described herein.

Referring now to FIG. 1, an automatic pallet unloading conveyor system 10 for automatically unloading a pallet from a dolly is shown. The automatic pallet unloading conveyor system 10 may comprise an output conveyor system 12, a throughput conveyor system 14, an automatic unloading dolly 100, and an automatic unloading dolly guide system 16 for guiding the automatic unloading dolly 100 to the throughput conveyor system 14.

The output conveyor system 12 may comprise one or more output conveyors 15. The output conveyors 15 may convey a pallet or other item from the throughput conveyor system 14 to a system external to the automatic pallet unloading conveyor system 10. The pallets may be automatically sorted to the correct output conveyor 15 and then travel down one of the output conveyors 15 leaving the automatic pallet unloading conveyor system 10. The pallets may be automatically identified and subsequently sorted using one or more identification means, such as, for example, RFID tags, laser scanners, image recognition, or other means. The output conveyor 15 that is used to send the pallet to the external system may sort the pallets based on the identification of the pallet, the identification of a tool, workpiece, or other item within the pallet, or by some other means.

Figure 7:
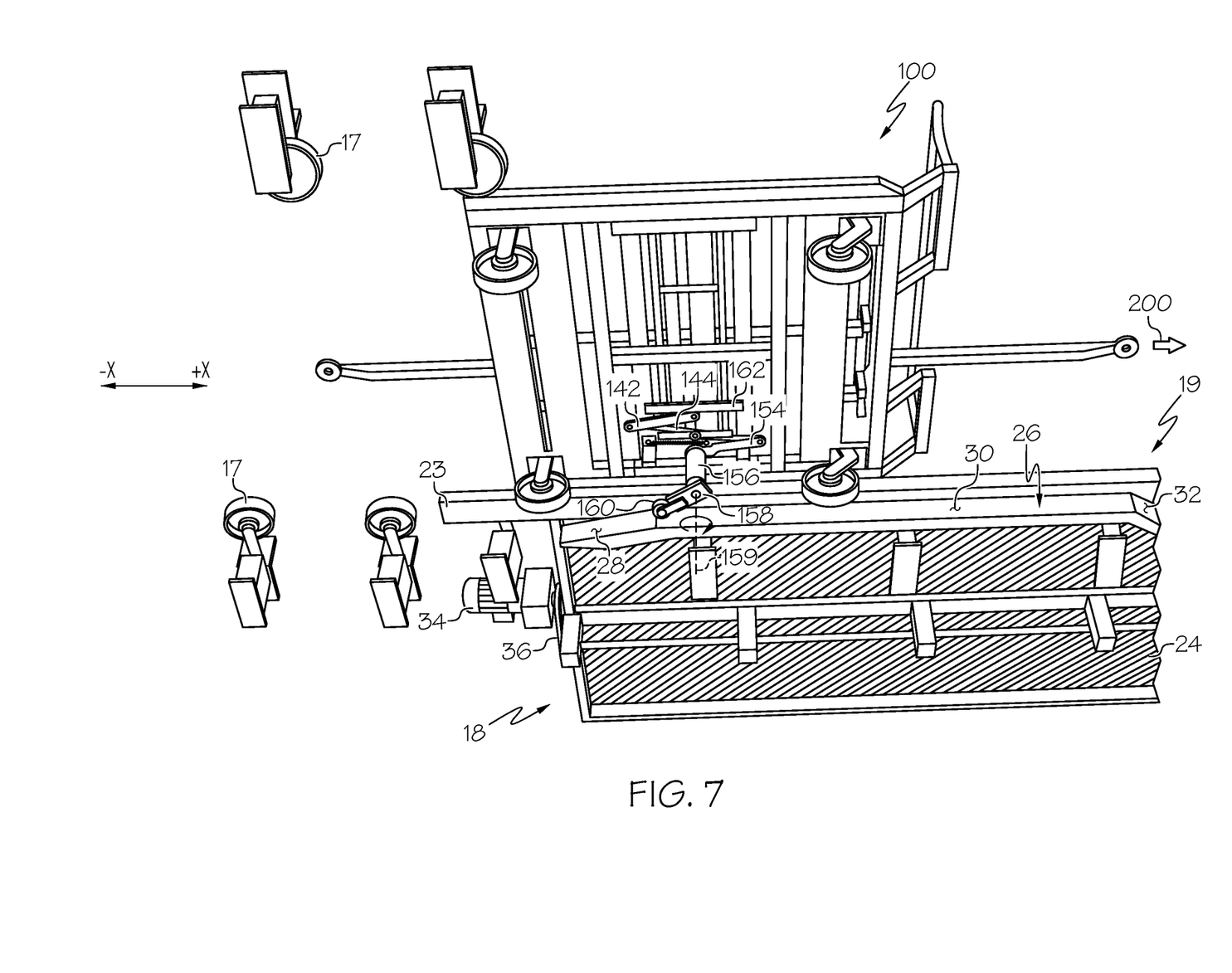
FIG. 7 depicts a bottom view of an automatic unloading dolly and a landing conveyor for receiving a pallet from the automatic unloading dolly, according to one or more embodiments shown and described herein.

The throughput conveyor system 14 may convey a pallet or other item from the automatic unloading dolly 100 to the output conveyor system 12 as the automatic unloading dolly 100 moves by the throughput conveyor system 14. The throughput conveyor system 14 may comprise a landing conveyor 18, an intermediate conveyor 20, and one or more sorting stages 22. Briefly referring to FIG. 7, the landing conveyor 18 may comprise an angled conveyor that comprises a frame 23 and plurality of rotating cylinders 24, each of the rotating cylinders 24 having a longitudinal axis that is skewed from the forward and rearward direction of motion, or conveying direction, of the automatic unloading dolly 100 (+/− X direction as shown in FIG. 7), such as the forty-five degree angle shown, such that a pallet will slide at an angle with respect to the frame 23 as the pallet transitions from the automatic unloading dolly 100 to the landing conveyor 18 as will be described in greater detail below. Referring back to FIG. 1, the landing conveyor 18 may comprise a landing conveyor plane 19 formed by the plurality of rotating cylinders 24. The landing conveyor plane 19 may be a plane that is tangential to each of the rotating cylinders of the plurality of rotating cylinders 24 at the top of each of the plurality of the rotating cylinders 24. The rotating cylinders 24 of the landing conveyor 18 may enable motion of a pallet in the landing conveyor plane 19 in both the dolly lateral direction (+/− Y direction) and the dolly longitudinal direction (+/− X direction) equally to obliquely transfer the pallet from the automatic unloading dolly 100 to the throughput conveyor system 14. When a pallet leaves the automatic unloading dolly 100, the pallet slides in both the +Y and +X directions until it is stopped by a wall 25 at the end of the frame 23. When the pallet engages the wall 25, the pallet can only slide in the +X direction until it reaches the intermediate conveyor 20. The forward momentum in the +X direction of a pallet resting on the automatic unloading dolly 100 is not inhibited as the pallet is unloaded from the automatic unloading dolly 100 onto the landing conveyor 18.

In some embodiments, the force that rotates the rotating cylinders 24 is the momentum of a pallet that is unloaded from the automatic unloading dolly 100 as the automatic unloading dolly 100 is moving in the conveying direction. The automatic unloading dolly 100 may be moving forward in the dolly longitudinal direction, and thus, a pallet resting on the automatic unloading dolly 100 will also be moving forward in the dolly longitudinal direction. As the pallet is moved from the automatic unloading dolly 100 to the rotating cylinders 24, the pallet's forward momentum will rotate the rotating cylinders 24. In some embodiments, the rotating cylinders 24 may be motorized or otherwise configured to be driven automatically, thereby helping to move a pallet from the landing conveyor 18 to the intermediate conveyor 20. Briefly referring to FIG. 7, the rotating cylinders 24 may be driven by a motor 34 and a drive belt 36 that mechanically couples the rotating cylinders 24 to the motor 34 to drive the rotating cylinders 24.

The intermediate conveyor 20 may connect the landing conveyor 18 with the output conveyor system 12. As shown in the example embodiment in FIG. 1, the intermediate conveyor 20 may comprise a 180-degree bend, but other embodiments may include bends of greater or less than 180 degrees. In some embodiments, the intermediate conveyor may be straight, without bends.

The automatic unloading dolly 100 may approach the landing conveyor 18 through the automatic unloading dolly guide system 16. The automatic unloading dolly guide system 16 may comprise a pattern of dolly guides 17 that may be laterally opposed that form a receiving boundary for the automatic unloading dolly 100 as it approaches the landing conveyor 18 along the dolly path 200 to ensure that the automatic unloading dolly 100 is correctly placed against the landing conveyor 18 to unload the pallets or other items on the automatic unloading dolly 100.

The dolly guides 17 may be formed by mounting a rubber tire or other buffering mechanism laterally on a suspension spring. In some embodiments, the lateral distance between dolly guides 17 directly opposite one another may gradually decrease along the path of travel of the automatic unloading dolly 100 toward the landing conveyor 18 (in a "V" shape) giving the automatic unloading dolly 100 a wider entrance to the automatic unloading dolly guide system 16. The dolly guides 17 may also be arranged such that the appropriate portion of the automatic unloading dolly 100 contacts the landing conveyor 18 as the automatic unloading dolly 100 passes therealong. Additionally, while the embodiment of the automatic pallet unloading conveyor system 10 shown in FIG. 1 depicts only one automatic unloading dolly 100 approaching the landing conveyor 18, it is to be understood that one or more automatic unloading dollies or other equipment may be towed in sequence through the dolly guides 17 and along the landing conveyor 18 linked one behind the other.

Figure 2:
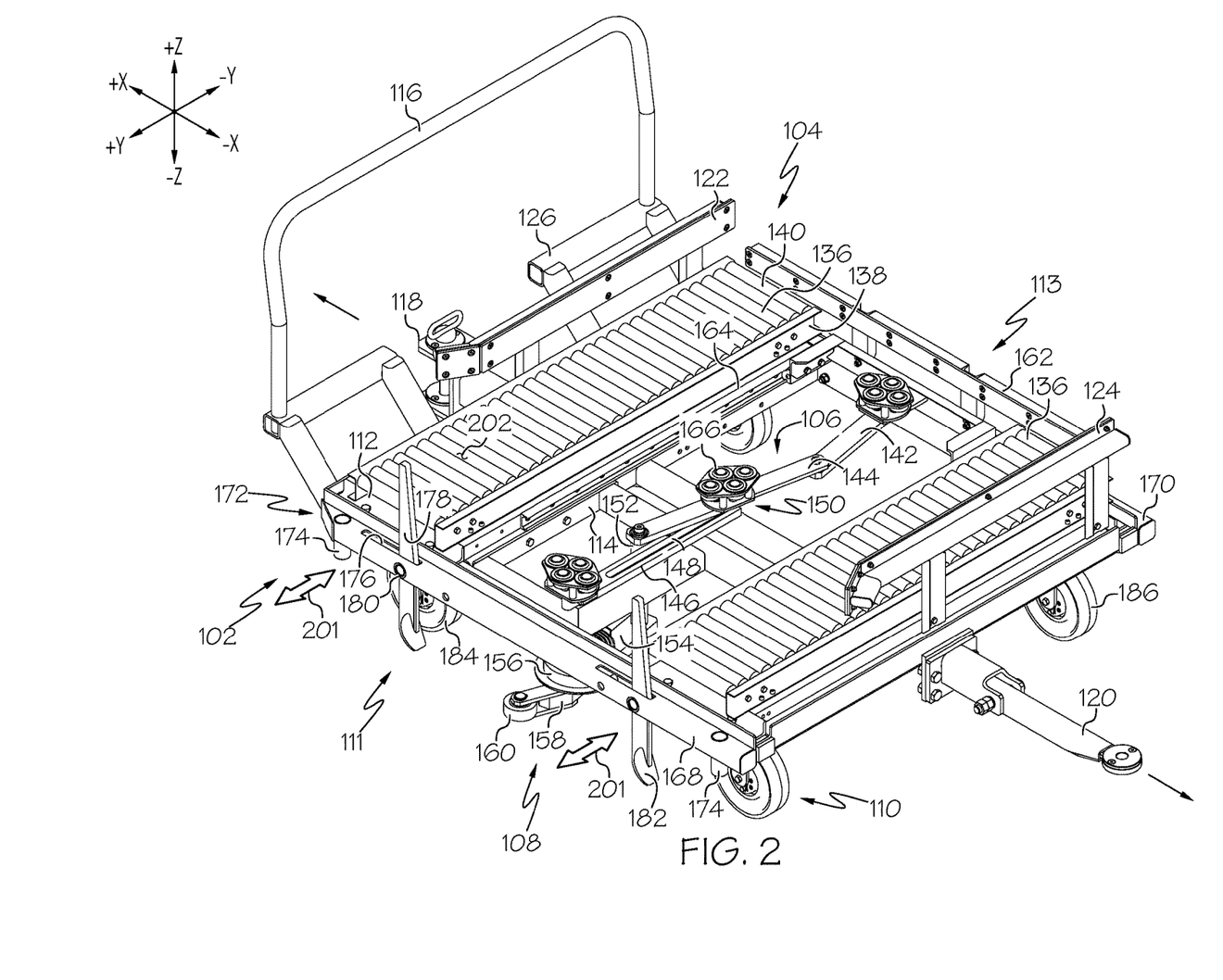
FIG. 2 depicts an isometric view of the top of a dolly having an automatic unloading linkage system for automatically unloading a pallet from the dolly, according to one or more embodiments shown and described herein.

Referring now to FIG. 2, an example embodiment of the automatic unloading dolly 100 is depicted in isolation. The automatic unloading dolly 100 may include a frame 102, a dolly conveyor system 104, a multi-bar linkage system 106, a gate and guide assembly 108, and a wheel assembly 110. The automatic unloading dolly 100 may be configured to hold one or more pallets on the dolly conveyor system 104 and be pulled behind one or more tuggers on an assembly floor to deliver tools, equipment, and/or other objects from the one or more pallets to workstations on the assembly floor. Additionally, it should be understood that the automatic unloading dolly 100 is not limited to carrying tools and equipment, but could carry any item that will fit on the automatic unloading dolly 100 and that the automatic unloading dolly 100 is not limited to being pulled by a tugger but could be pulled by any other sort of equipment.

The frame 102 may include a loading/unloading side 111, a pusher side 113, one or more longitudinal supports 112 and one or more lateral supports 114. The frame 102 may generally define a width and length of the automatic unloading dolly 100. The frame 102 may include a handle 116, a fore coupler 118, an aft coupler 120, a forward storage area guide 122, a rear storage area guide 124, and one or more front supports 126. The dolly conveyor system 104, multi-bar linkage system 106, and the gate and guide assembly 108 may be mounted to the frame 102.

The handle 116 may extend vertically from the front supports 126. In the example embodiment shown, the handle 116 extends substantially the entire width of the frame 102 but in other embodiments the handle may only partially extend the width of the frame. Embodiments having one or more handles or a handle that does not extend substantially the entire width of the frame 102 are contemplated. The handle 116 may be used to manually push the automatic unloading dolly 100, such as when the automatic unloading dolly 100 is not coupled to a chain of two or more automatic unloading dollies and being pulled by a tugger or other equipment.

Figure 3:
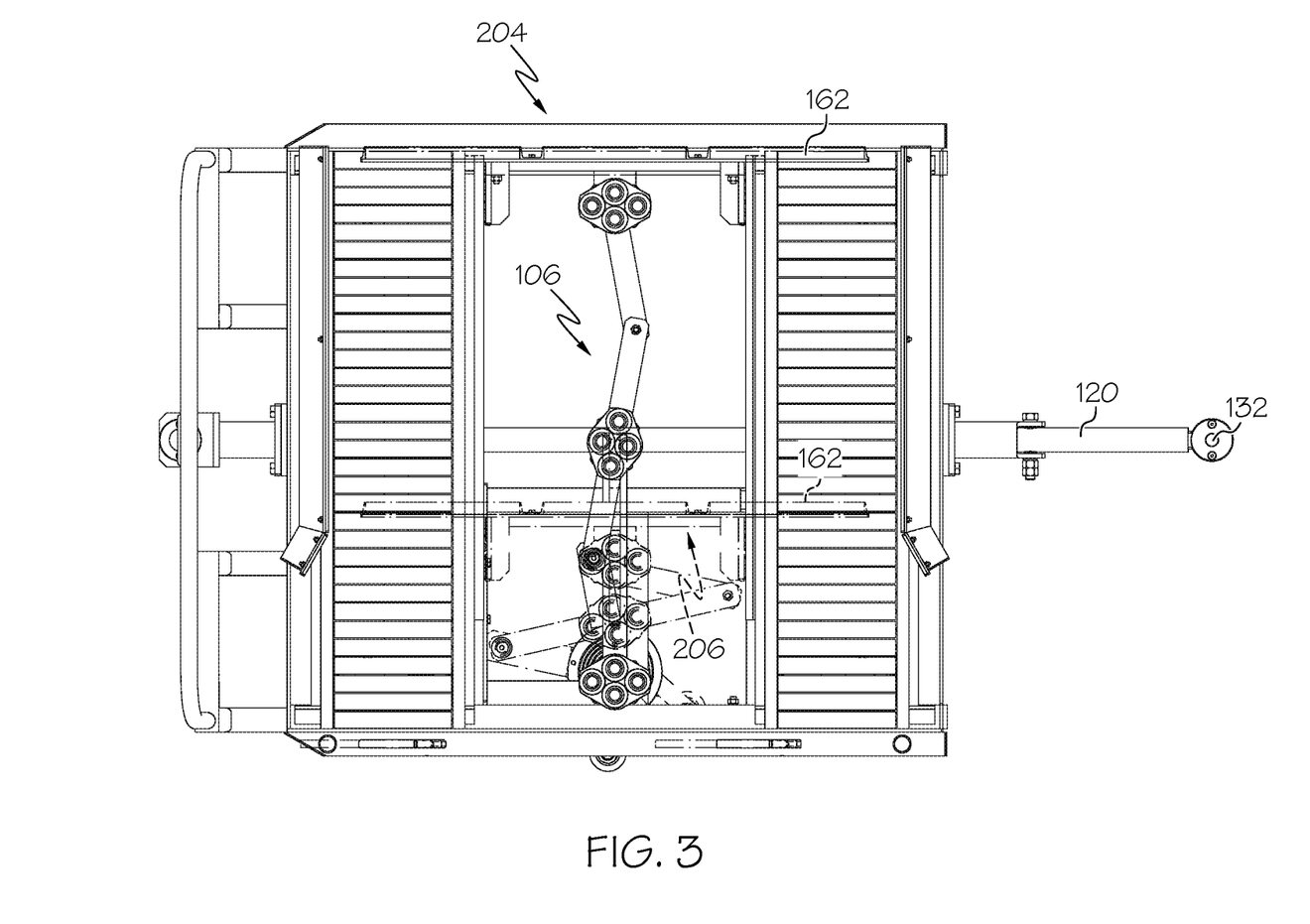
FIG. 3 depicts a top view of the dolly of FIG. 1, according to one or more embodiments shown and described herein.

The fore coupler 118 and the aft coupler 120 may be used to couple multiple dollies, such as several of the automatic unloading dollies 100, in a chain. Briefly referring to FIG. 4, in the particular example embodiment shown, the fore coupler 118 comprises a clevis link 128 and a clevis pin 130, with the clevis pin 130 oriented in the vertical direction. The clevis pin 130 may be configured to couple to the aft coupler 120 of another automatic unloading dolly 100 or other system. Accordingly, with brief reference to FIG. 3, the aft coupler 120 may comprise a pin hole 132, but embodiments are not so limited. It is contemplated that multiple automatic unloading dollies or other towed equipment may be linked using any suitable linking device. Referring again to FIG. 4, in some embodiments, the aft coupler 120 may be configured to rotate in the dolly vertical direction (counter-clockwise as shown in FIG. 4) about a pivot point 134 to increase the usability of the automatic unloading dolly 100. For example, the aft coupler 120 may rotate in order to minimize the overall length of the automatic unloading dolly 100 for convenient storage.

Referring once again to FIG. 2, the dolly conveyor system 104 may include one or more conveyor platforms 136 comprising brackets 138 and a series of cylindrical rollers 140 between the brackets 138. The cylindrical rollers 140 may be a plurality of cylinders having equal radii, each cylindrical roller 140 spanning an equal length along a longitudinal axis between the brackets 138. The longitudinal axis of each cylindrical roller 140 may be in a common plane with each of the longitudinal axes of the other cylindrical rollers 140 and parallel to the direction of forward and rearward motion of the automatic unloading dolly 100. The cylindrical rollers 140 may be mounted side-by-side on roller bearings and configured to freely rotate about their longitudinal axis, thus forming a pallet movement axis 201 that is perpendicular to the direction of forward and rearward motion of the automatic unloading dolly 100 and tangential to the outer surface of the one or more cylindrical rollers 140. Additionally, because the radii of each of the cylindrical rollers 140 are equivalent and they are side-by-side, the outer surfaces of the cylindrical rollers 140 form a storage plane 202. While cylindrical rollers are illustrated, other roller types may be used, such as wheels, spheres, etc. For example, in the example embodiment shown in FIGS. 6A and 6B, the pallet or other item to be stored on the automatic unloading dolly 100 may be configured to slide in the dolly-lateral direction along a wheel rail 165 comprised of one or more wheels disposed in the frame 102 of the automatic unloading dolly 100.

The storage plane 202 may be a flat plane that is tangential to the circumference of each the cylindrical rollers 140. Pallets and or other equipment may be moved on the storage plane 202 by rolling the pallets on and off the storage plane 202 along the pallet movement axis 201. Because the cylindrical rollers 140 rotate, there can be a relatively low resistance to motion along the pallet movement axis 201 compared to sliding the pallet along a static surface. When a pallet is pushed over the conveyor platforms 136, the cylindrical rollers 140 in contact with the pallet spin about their longitudinal axes, allowing the pallet to slide on and off of the automatic unloading dolly 100 with reduced resistance to moving. However, the movement of the pallet may be inhibited by the gate and guide assembly 108 and the multi-bar linkage system 106 as will be described in greater detail below.

Figure 5:
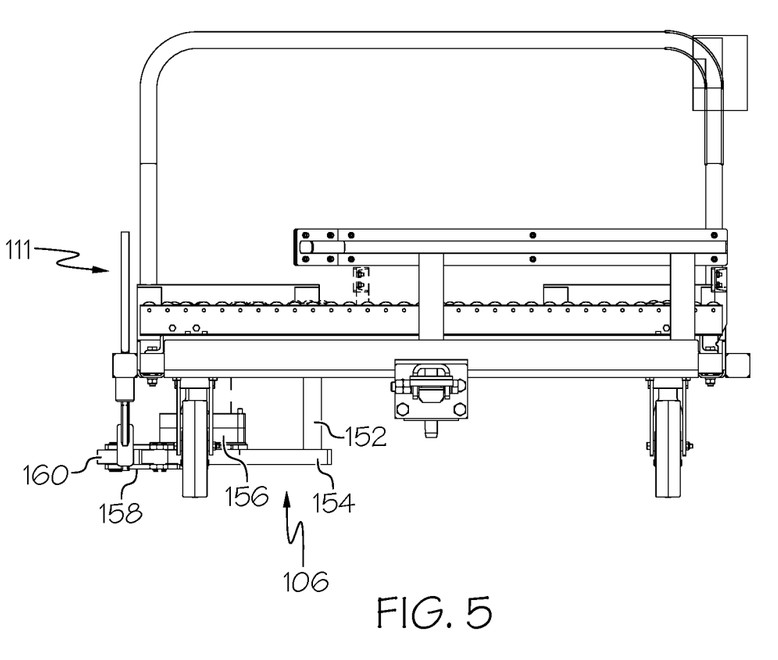
FIG. 5 depicts a front view of the dolly of FIG. 1, according to one or more embodiments shown and described herein.

Still referring to FIG. 2, the multi-bar linkage system 106 may include a first bar link 142, a second bar link 144 and a guide link 146. The guide link 146 may be fixed and may include a slot 148 in which a bar link pin 150 of the second bar link 144 slides back and forth (best shown in FIGS. 6A and 6B) relative to the guide link 146. The bar link pin 150 may protrude from above and/or below the second bar link 144 midway along the length of the second bar link 144 and into the slot 148. Briefly referring to FIG. 5, the multi-bar linkage system 106 further includes a vertical bar link 152, a third bar link 154, a clock spring 156, and a contact arm link 158 that may protrude from the loading/unloading side 111 of the automatic unloading dolly 100 and include a rolling contact 160. Referring once again to FIG. 2, the multi-bar linkage system 106 also includes a pusher 162, and one or more pusher guides 164 that provide tracks along which the pusher 162 can slide. Briefly referring to FIG. 3, the multi-bar linkage system 106 may actuate to move the pusher 162 along the pusher guides 164 between a pusher base position 204 and a pusher triggered position 206.

Other arrangements of the multi-bar linkage are considered. For example, with brief reference to FIGS. 6A and 6B, an embodiment of the automatic unloading dolly 100 having a multi-bar linkage system 106 in which the second bar link 144 is below the guide link 146 is shown. The bar link pin 150 may protrude through the second bar link 144 and extend into the slot 148 to prevent translation of the second bar link in the dolly-longitudinal direction as described below.

Referring back to FIG. 2, the first bar link 142 pivotally connects to each of the second bar link 144 and the pusher 162. The second bar link 144 pivotally connects between the first bar link 142 and the third bar link 154 by the vertical bar link 152 which may be pivotal at its connection to either or both of the second bar link 144 and the third bar link 154, allowing relative rotational motion between the second bar link 144 and the third bar link 154. The contact arm link 158 may be coupled to the third bar link 154 through the clock spring 156, however, in some embodiments the contact arm link 158 and the third bar link 154 may comprise a single link.

The slot 148 may comprise a channel or groove in the guide link 146 that prevents translational motion of the second bar link 144 in the forward and rearward directions of travel (+/− X direction) of the automatic unloading dolly 100. The guide link 146 may allow rotation about the bar link pin 150 and translation of the second bar link 144 in the lateral direction, however, rotation of the second bar link 144 may be fixed about any point along the lateral line formed by the guide link 146. In the particular embodiment shown in FIG. 2, the bar link pin 150 slides back and forth in the dolly lateral direction (+/− Y direction) in the slot 148.

The pusher 162 may be a substantially flat surface that is translatably mounted to the frame at the pusher guides 164 and pivotally connected to the first bar link 142. The pusher 162 may translate in the dolly lateral direction (+/− Y direction) when the multi-bar linkage system 106 is actuated. The pusher 162 may push a pallet or other items from the storage plane 202 by causing the pallet to slide over the cylindrical rollers 140. In some embodiments, the pusher 162 forms a substantially flat plane parallel to the forward and rearward direction of motion of the automatic unloading dolly 100 and perpendicular to the pallet movement axis 201 as the pallet is pushed off the automatic unloading dolly 100.

Figure 6A:
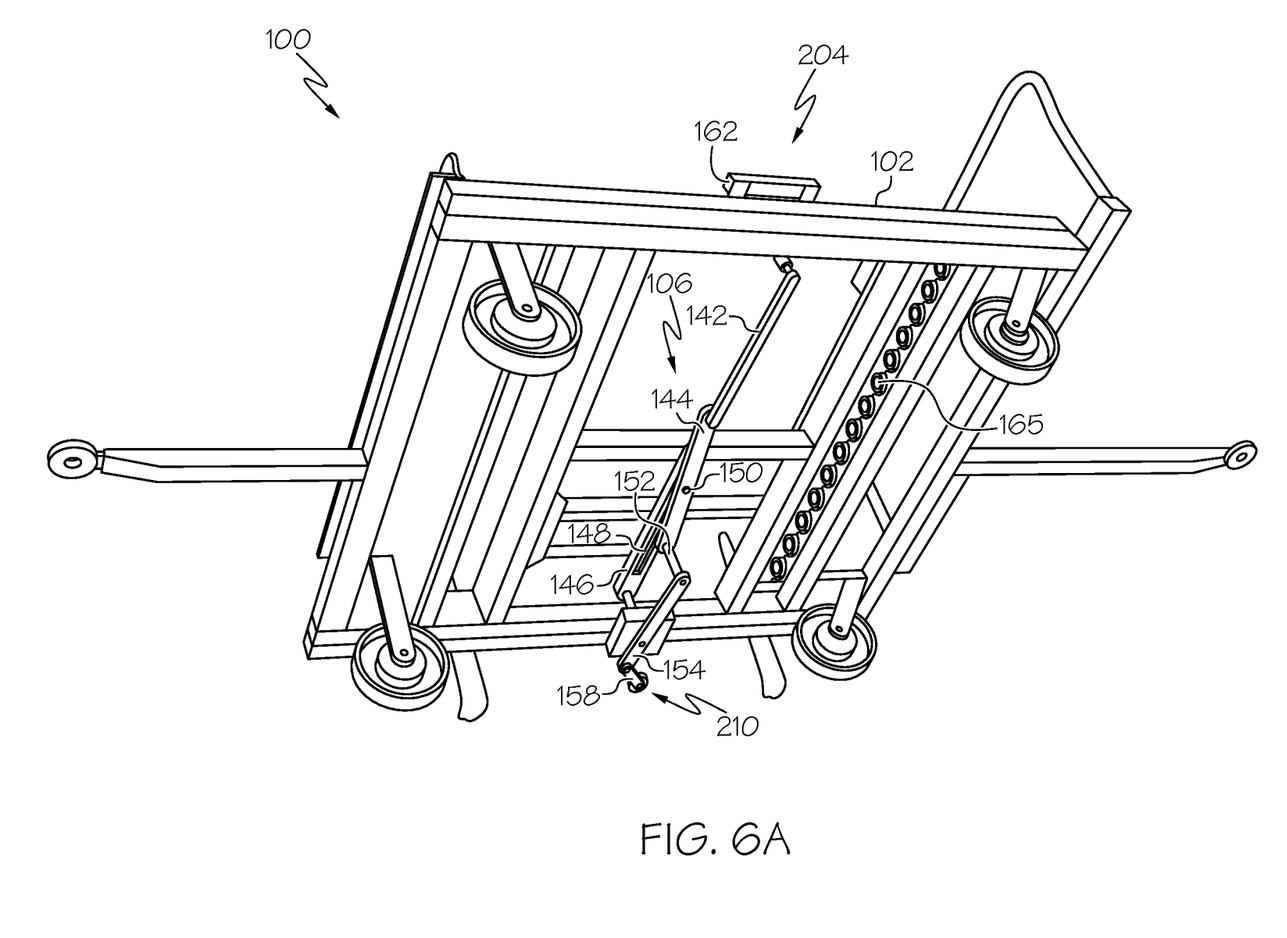
FIG. 6A depicts an isometric view of the bottom of the dolly of FIG. 2 having an extended multi-bar linkage system, according to one or more embodiments shown and described herein.
Figure 6B:
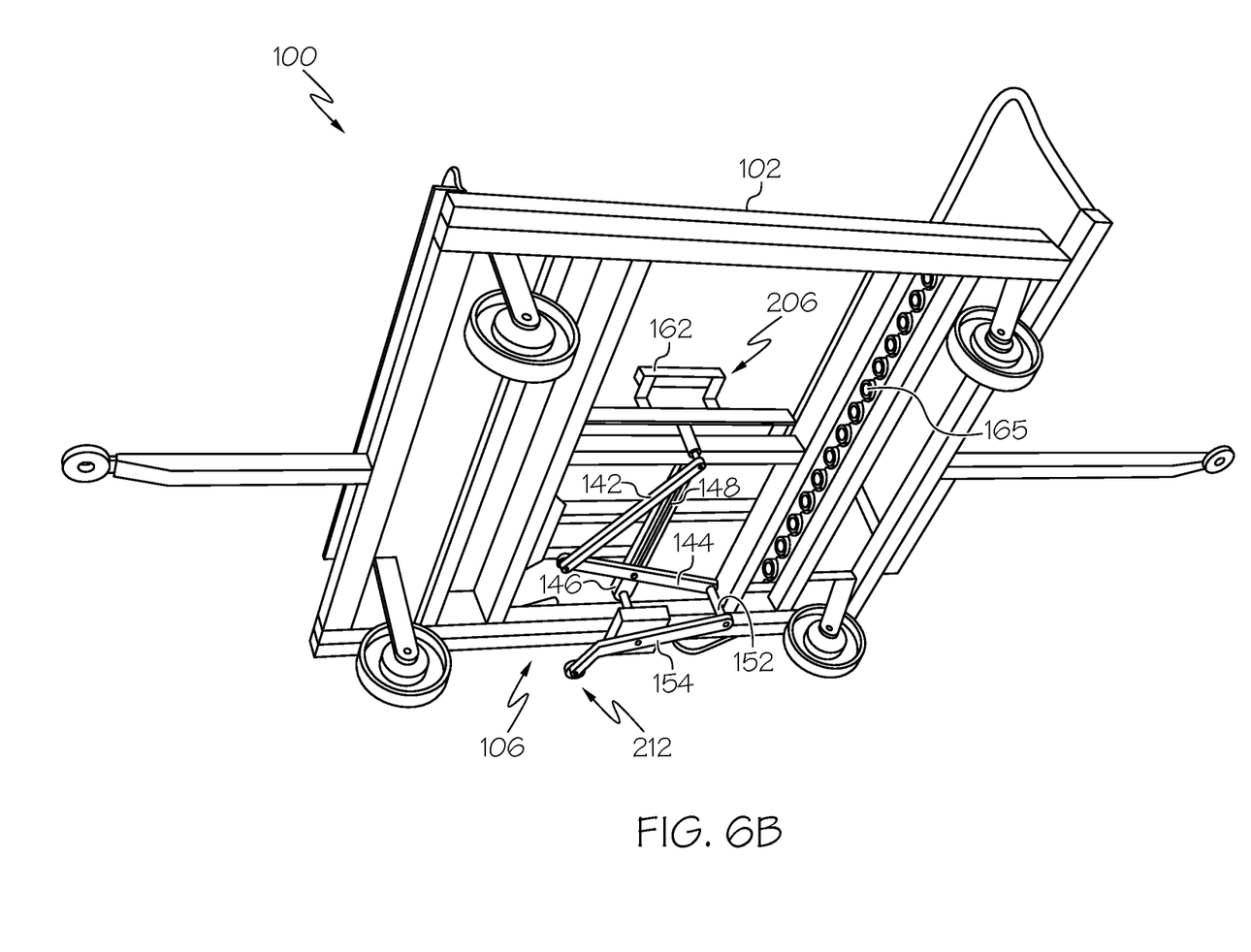
FIG. 6B depicts an isometric view of the bottom of the dolly of FIG. 5 including a retracted multi-bar linkage system, according to one or more embodiments shown and described herein.

Briefly referring to FIGS. 6A and 6B, the contact arm link 158 may be configured to rotate between a contact arm link base position 210 (FIG. 6A) and a contact arm link triggered position 212 (FIG. 6B). When the contact arm link 158 is triggered, as will be described in greater detail below, the contact arm link 158 rotates the third bar link 154, pulling the vertical bar link 152 and with it the second bar link 144, first bar link 142, and pusher 162 toward the contact arm link 158 such that the pusher 162 can force a pallet resting on the dolly conveyor system 104 off of the automatic unloading dolly 100 and onto the landing conveyor 18 of FIG. 1.

Referring back to FIG. 2, triggering the contact arm link 158 may charge the clock spring 156, converting the forward kinetic energy of the automatic unloading dolly 100 into rotational kinetic energy of the contact arm link 158 and converting the rotational kinetic energy of the contact arm link 158 into potential energy within the coil of the clock spring 156. The clock spring 156 uncoils when the contact arm link 158 is released, and the stored potential energy is used to return the contact arm link 158 to the untriggered position and the pusher 162 to the pusher base position 204.

The multi-bar linkage system 106 may further include one or more roller bearing supports 166. The roller bearing supports 166 may comprise one or more ball bearings having a ball that can rotate within and at least partially protrudes from a race. The uppermost point of the ball is within or parallel to the storage plane 202. Said another way, the uppermost point of the ball in the ball bearing is parallel to the uppermost point in the circumference of each of the cylindrical rollers 140. Such an arrangement of the roller bearing supports 166 provides additional rolling members to facilitate movement of the pallets.

The gate and guide assembly 108 may include a first guide rail 168 and a second guide rail 170. The first guide rail 168 and the second guide rail 170 may be mounted to opposite sides of the frame 102 of the automatic unloading dolly 100 extending along the left and right sides of the automatic unloading dolly 100. The first guide rail 168 and the second guide rail 170 may be made from rubber, plastic, or some other material that is more energy-absorbent than the frame 102 such that they absorb some energy when the frame 102 contacts other objects, such as, for example, the dolly guides 17, reducing the impact on the frame 102.

The first guide rail 168 and the second guide rail 170 may extend substantially the entire length of the frame 102 of the automatic unloading dolly 100 and may include diagonal profile cuts 172 at the front of the automatic unloading dolly 100 that may help guide the automatic unloading dolly 100 into the correct position to make contact with the landing conveyor 18. The first guide rail 168 may include one or more guide pins 174, one or more gate slots 176, and one or more pivoting gates 178 that pivotally couple to the first guide rail 168 at a pivot point 180. The one or more pivoting gates 178 may include a pad 182.

The pivoting gates 178 may be disposed in the gate slots 176 and can pivot about the pivot points 180 within the gate slots 176. The gate slots 176 are slots of sufficient length such that they provide sufficient clearance for the pivoting gates 178 to pivot until a top portion 179 of the pivoting gate 178 is clear of (i.e., below) the storage plane 202. When the pivoting gates 178 are not clear of the storage plane 202, the pivoting gates 178 inhibit one or more pallets or other items from exiting the storage plane 202 by obstructing the direction of movement along the pallet movement axis 201. The pivoting gates 178 may pivot about the pivot points 180 when a force is applied to the pad 182 in the dolly rearward direction.

Figure 4:
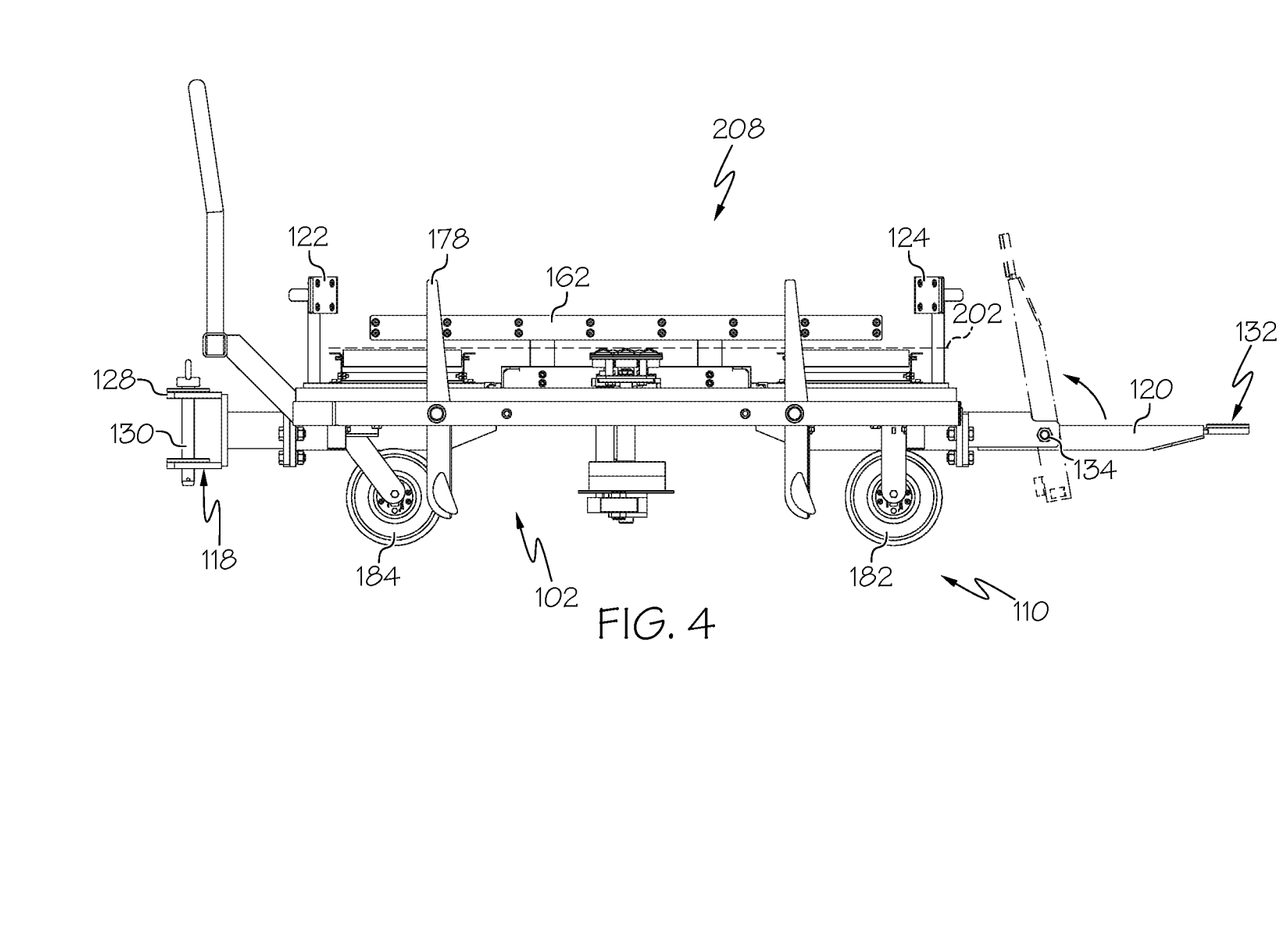
FIG. 4 depicts a side view of the dolly of FIG. 1, according to one or more embodiments shown and described herein.

Referring to FIG. 4, the automatic unloading dolly 100 may include the wheel assembly 110, which may include one or more front wheels 184 and one or more rear wheels 186 mounted to the frame 102. The front wheels 184 may be pivotally coupled to the frame 102 and the rear wheels 186 may be fixedly coupled to the frame 102 allowing the automatic unloading dolly 100 to be steered left and right as it travels in the forward and rearward directions, but embodiments are not so limited. It is contemplated that the automatic unloading dolly 100 may comprise any combination of pivotally- or non-pivotally-coupled wheels.

Still referring to FIG. 4, the forward storage area guide 122, the rear storage area guide 124, the pusher 162 and the one or more pivoting gates 178 may form a storage area 208 that extends upward from the storage plane 202. One or more pallets or other items may be placed in the storage area 208 to be pulled from one place to another while resting on the automatic unloading dolly 100, for example to a workstation on a vehicle assembly floor where the tool may utilized to, for example, assemble a vehicle.

The operation of the automatic pallet unloading conveyor system 10 and automatic unloading dolly 100 will now be described. Referring to FIG. 1, the automatic unloading dolly 100 is shown passing along the dolly path 200 between the dolly guides 17. The automatic unloading dolly 100 may be pulled by a tugger or other equipment and there may be one or more dollies or other equipment in a chain which are not shown here for ease of illustration purposes. The automatic unloading dolly 100 may be pulled along the dolly path 200 with the loading/unloading side 111 of the automatic unloading dolly 100 toward the landing conveyor 18.

Referring now to FIGS. 1 and 2, as the automatic unloading dolly 100 approaches the landing conveyor 18, the bottom of a forward pivoting gate 178 may strike a guide channel beneath the forward pivoting gate 178 causing the pivoting gate 178 to rotate about the pivot point 180. The pivoting gate 178 is configured to rotate about the pivot point 180 in the gate slot 176 until the top of the pivoting gate 178 is below the storage plane 202. By removing the pivoting gate 178 from above the storage plane 202, the pusher 162 can push whatever is in the storage area 208 off of the automatic unloading dolly 100 and onto the landing conveyor 18. As shown in FIG. 2, the pusher 162 is in the pusher base position 204, but it will be moved to the pusher triggered position 206 as the automatic unloading dolly 100 continues to move along the dolly path 200 and the contact arm link 158 is triggered.

Referring now to FIG. 7, an example embodiment of the automatic unloading dolly 100 is shown passing the landing conveyor 18 and unloading the contents of the automatic unloading dolly 100. For ease of illustration, the example embodiment of the automatic unloading dolly 100 shown is not connected to another automatic unloading dolly or a tugger at the fore and aft connection locations, but it is to be understood that in operation the automatic unloading dolly 100 may have one or more other dollies or carts in front of or behind the automatic unloading dolly 100 and that the automatic unloading dolly 100 or chain of automatic unloading dollies may be pulled by a tugger or other hauling or towing equipment.

The automatic unloading dolly 100 is shown beside the landing conveyor 18, and as depicted is in the process of unloading tools or equipment from the storage plane 202 of the automatic unloading dolly 100 with the pusher 162 in the pusher triggered position 206. A bottom view of the automatic unloading dolly 100 is shown to explain the action of the multi-bar linkage system 106 as the automatic unloading dolly 100 passes the landing conveyor 18 while the automatic unloading dolly 100 is travelling along the dolly path 200.

As the automatic unloading dolly 100 continues along the dolly path 200, the rolling contact 160 of the contact arm link 158 contacts a contact arm link rail 26 of the landing conveyor 18. The contact arm link rail 26 is beneath the landing conveyor plane 19 and comprises a first angled portion 28, a longitudinal portion 30, and a second angled portion 32. The contact arm link 158 first contacts the first angled portion 28, then contacts the longitudinal portion 30, and then contacts the second angled portion 32 as the automatic unloading dolly 100 is pulled along the dolly path 200.

When the contact arm link 158 contacts the contact arm link rail 26, it may rotate about a contact arm link rotation axis 159. The first angled portion 28 may be angled to cause the contact arm link 158 to increase its angle of rotation about the contact arm link rotation axis 159 as the automatic unloading dolly 100 continues moving forward along the dolly path 200. The longitudinal portion 30 may be closer to the automatic unloading dolly 100 than the first angled portion 28 in order to provide a ramped surface along which the contact arm link 158 follows. As the automatic unloading dolly 100 continues to move forward with the rolling contact 160 in continuous contact with the contact arm link rail 26, the angle of rotation of the contact arm link 158 about the contact arm link rotation axis 159 continues to increase and thus the contact arm link 158 is rotated from the contact arm link base position 210 to the contact arm link triggered position 212 and the pusher 162 is pulled toward the pusher triggered position 206 as described above. As the pusher 162 is pulled toward the pusher triggered position 206, it pushes anything on the storage plane 202 off of the automatic unloading dolly 100 and out of the storage plane 202. Additionally, as the contact arm link 158 is rotated about the contact arm link rotation axis 159, the clock spring 156 is charged. Thus, the rotational kinetic energy of the contact arm link 158 is stored as potential energy in the clock spring 156.

The angle of the first angled portion 28 and the speed of the automatic unloading dolly 100 control the unloading rate of the automatic unloading dolly 100. That is, the unloading speed of the automatic unloading dolly 100 is proportional to both the speed of the automatic unloading dolly 100 and the angle of the first angled portion 28 as compared to the longitudinal portion 30. If the speed of the automatic unloading dolly 100 increases along the dolly path 200, the rolling contact 160 will travel along the first angled portion 28 more quickly, rotating the contact arm link 158 more quickly causing the pusher 162 to travel from the pusher base position 204 to the pusher triggered position 206 more quickly. Correspondingly, if the angle of the first angled portion 28 increases with respect to the longitudinal portion 30, the contact arm link 158 will rotate about the contact arm link rotation axis 159 more quickly, also causing the pusher 162 to travel from the pusher base position 204 to the pusher triggered position 206 more rapidly.

Still referring to FIG. 7, the automatic unloading dolly 100 continues to move along the dolly path 200. Once the rolling contact 160 is contacting the longitudinal portion 30 of the contact arm link rail 26 the angle of rotation of the contact arm link 158 about the contact arm link rotation axis 159 is fixed and thus the pusher 162 will remain in the pusher triggered position 206 until the angle of rotation of the contact arm link 158 about the contact arm link rotation axis 159 changes.

The second angled portion 32 of the contact arm link rail 26 is angled opposite the first angled portion 28, so once the rolling contact 160 reaches the second angled portion 32, the lateral distance between the automatic unloading dolly 100 and the contact arm link rail 26 increases. The rolling contact 160 would come out of contact with the contact arm link rail 26 except that the potential energy stored in the clock spring 156 causes the contact arm link 158 to rotate about the contact arm link rotation axis 159 in the counter clockwise direction as shown in FIG. 7 to unwind the clock spring 156, moving the contact arm link 158 from the contact arm link triggered position 212 to the contact arm link base position 210 and moving the pusher 162 from the pusher triggered position 206 to the pusher base position 204. Thus, the second angled portion 32 of the contact arm link rail 26 acts as a cam and the rolling contact 160 a cam follower until the pusher 162 is back in the pusher base position 204. The rate of release of the clock spring 156 will thus depend on the speed of the automatic unloading dolly 100, the angle of the second angled portion 32 as compared to the longitudinal portion 30, and the spring coefficient of the clock spring 156.

The contact arm link 158 may be a portion of or coupled to the third bar link 154. Thus, as the contact arm link 158 rotates about the contact arm link rotation axis 159, so does the third bar link 154. The third bar link 154 is pivotally connected to the second bar link 144 as described above. Hence, as the third bar link 154 rotates, it causes the second bar link 144 to rotate about the bar link pin 150.

The second bar link 144 rotates as it is pulled by the third bar link 154 but the translation of the second bar link 144 is fixed at the bar link pin 150 because the bar link pin 150 is disposed in the slot 148 in the guide link 146 which is fixed with relation to the longitudinal dimension of the frame 102. Hence, the translation of bar link pin 150 is fixed in relation to the longitudinal dimension of the frame 102. As the second bar link 144 rotates, it pulls and rotates the first bar link 142, which is pivotally coupled to the pusher 162.

As shown in FIGS. 6A and 6B, the pusher 162 is translated in the dolly lateral direction over the storage plane 202 a full stroke from the pusher base position 204 to the pusher triggered position 206 to push any objects on the automatic unloading dolly 100 in the storage plane 202 off of the automatic unloading dolly 100. The pusher 162 is guided by the pusher guides 164 along the distance of the pusher stroke. The distance of the pusher stroke is defined as the maximum distance that the pusher 162 travels from a fully extended position in the pusher base position 204 to when the pusher 162 is in the fully retracted position in the pusher triggered position 206.

The pusher 162 may push a pallet or other item from the storage area 208 to the landing conveyor plane 19 of the landing conveyor 18. The pallet or other item may slide along a landing conveyor motion axis once it is on the landing conveyor 18. Because the pallet or other item is mounted on the dolly conveyor system 104 as described above, the pallet or other item will slide on and off of the automatic unloading dolly 100 relatively easily. The pallet may then travel along the throughput conveyor system 14 to the output conveyor system 12 for further sorting of the pallet or other item. For example, the pallet may travel around the 180 deg. bend in the throughput conveyor system 14 to the output conveyor system 12 where it may be sorted and sent to an external system. Meanwhile, the automatic unloading dolly 100 or chain of automatic unloading dollies may continue to move forward along the dolly path 200.

It should now be understood that tools and/or other equipment may be delivered to workstations on a vehicle assembly floor using a delivery vehicle such as a dolly or a cart. A single dolly may carry a plurality of tools, and moreover, a series of dollies or carts may be strung together, removing the need for tools to be delivered to workstations using individual tuggers thereby multiplying efficiencies. The dollies or chains thereof may deliver the tools or other equipment with the tool in a bin on a pallet on the dolly. Using this method, tools, bins, and/or pallets may be placed on and removed from dollies. Naturally, the more efficient a tool can be placed on and removed from a dolly, the more efficiently the tool can be delivered to a workstation. Hence, a dolly that has an automatic unloading multi-bar linkage system for automatically unloading one or more pallets from a dolly may be useful.

As used herein, the term "dolly-longitudinal direction" may refer to the +/− X direction. Additionally, the term "dolly-lateral direction" may refer to the +− Y direction.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An automatic unloading dolly that automatically unloads pallets therefrom, the automatic unloading dolly comprising:
   a frame having a loading/unloading side and a pusher side;
   a conveyor platform that extends between the loading/unloading side and the pusher side;
   one or more wheels connected to the frame;
   a multi-bar linkage system mounted to the frame and connected to a pusher that moves along the conveyor platform from the pusher side toward the loading/unloading side between a pusher base position and a pusher triggered position; and
   a contact arm link connected to the multi-bar linkage system such that movement of the contact arm link relative to the frame from a contact arm link base position to a contact arm link triggered position moves the multi-bar linkage system and the pusher from the pusher base position to the pusher triggered position.

2. The automatic unloading dolly of claim 1, wherein the multi-bar linkage system comprises a first bar link, a second bar link, and a third bar link, wherein:
   the first bar link is pivotally connected to the pusher and the second bar link,
   the second bar link is pivotally connected to the third bar link, and
   the third bar link is pivotally connected to the contact arm link, such that
   movement of the contact arm link from the contact arm link base position to the contact arm link triggered position moves the multi-bar linkage system.

3. The automatic unloading dolly of claim 2, wherein the multi-bar linkage system further comprises a guide link that guides the second bar link, preventing translational motion of the second bar link in a dolly-longitudinal direction but permits translational motion of the second bar link in a dolly-lateral direction and rotational motion of the second bar link.

4. The automatic unloading dolly of claim 3, wherein the second bar link comprises a bar link pin and the guide link is fixed to the frame and comprises a channel, the bar link pin slidably received in the channel.

5. The automatic unloading dolly of claim 1, further comprising a spring wherein rotation of the contact arm link from the contact arm link base position to the contact arm link triggered position winds the spring.

6. The automatic unloading dolly of claim 5, wherein the spring is a clock spring that is configured to unwind when the contact arm link is released, thereby returning the contact arm link to the contact arm link base position and the pusher to the pusher base position.

7. The automatic unloading dolly of claim 1, wherein the frame comprises one or more gates that include a top portion that selectively projects above a storage plane formed by the conveyor platform to inhibit one or more pallets from exiting the storage plane.

8. The automatic unloading dolly of claim 7, wherein the multi-linkage system comprises one or more roller bearing supports.

9. The automatic unloading dolly of claim 8, wherein the one or more roller bearing supports comprise one or more one or more ball bearings.

10. The automatic unloading dolly of claim 9, wherein an uppermost point of the one or more roller bearing supports is within the storage plane.

\* \* \* \* \*